United States Patent
Palin et al.

(10) Patent No.: US 9,628,979 B2
(45) Date of Patent: Apr. 18, 2017

(54) METHOD AND APPARATUS FOR UTILIZING ADVERTISEMENTS IN CONJUNCTION WITH DEVICE DISCOVERY

(75) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 234 days.

(21) Appl. No.: 13/591,791

(22) Filed: Aug. 22, 2012

(65) Prior Publication Data

US 2014/0057564 A1    Feb. 27, 2014

(51) Int. Cl.
*H04W 8/00* (2009.01)

(52) U.S. Cl.
CPC ............ H04W 8/005 (2013.01); *Y02B 60/50* (2013.01)

(58) Field of Classification Search
USPC ............................................. 455/41.4, 41.2
See application file for complete search history.

(56) References Cited

U.S. PATENT DOCUMENTS

| | | | |
|---|---|---|---|
| 6,892,052 B2 | 5/2005 | Kotola et al. | |
| 7,565,108 B2 | 7/2009 | Kotola et al. | |
| 2003/0092386 A1* | 5/2003 | Miklos et al. | 455/41 |
| 2003/0228842 A1* | 12/2003 | Heinonen et al. | 455/41.2 |
| 2004/0176032 A1* | 9/2004 | Kotola et al. | 455/41.2 |
| 2009/0252128 A1* | 10/2009 | Yang et al. | 370/338 |
| 2010/0317289 A1* | 12/2010 | Desai et al. | 455/41.2 |
| 2011/0021142 A1* | 1/2011 | Desai | H04W 8/005 455/41.2 |
| 2012/0300812 A1* | 11/2012 | Ly-Gagnon et al. | 375/135 |

OTHER PUBLICATIONS

Decuir, J.; "Bluetooth 4.0: Low Energy;" CSR; dated 2010.
Donovan, J.; "Bluetooth Goes Ultra-Low-Power;" Wireless Solutions—DigiKey Technology Zones; retrieved on Jun. 20, 2012 from <http://www.digikey.com/us/en/techzone/wireless/resources/articles/bluetooth-goes-ultra-low-power.html>.
Donovan, J.; "Bluetooth Low-Energy: An Introduction;" Low-Power Wireless; dated 2010; retrieved on Jun. 20, 2012 from <http://low-powerwireless.com/blog/2010/07/08/Bluetooth-low-energy-an-introduction/>.

(Continued)

Primary Examiner — Junpeng Chen
(74) Attorney, Agent, or Firm — Alston & Bird, LLP

(57) ABSTRACT

A method, apparatus and computer program product are provided for facilitating device discovery so as to consume less power with reduced channel occupancy. In regards to a method implemented by a master device, a scan for an advertisement is caused to be performed and an advertisement packet is received during the scan that defines a time period in which the source device of the advertisement packet will be performing a page scan. The method also determines the time period in which the source device of the advertisement packet will be performing the page scan. The method also causes a page to be issued during the time period in which the source device of the advertisement packet will be performing the page scan, and then receives a page response in response to the page. Corresponding apparatus and computer program products as employed by both master and slave devices are also provided.

25 Claims, 10 Drawing Sheets

(56) References Cited

OTHER PUBLICATIONS

Galeev, M.; "*Bluetooth 4.0: An introduction to Bluetooth Low Energy—Part I*;" EE Times, Design; dated Jul. 14, 2011; retrieved on Jun. 20, 2012 from <http://www.eetimes.com/design/communications-design/4217866/Bluetooth-4-0--An-introduction-to-Bluetooth-Low-Energy-Part-I>.

Galeev, M.; "*Bluetooth 4.0: An introduction to Bluetooth Low Energy—Part II*;" EE Times, Design; dated Jul. 28, 2011; retrieved on Jun. 20, 2012 from <http://www.eetimes.com/design/communications-design/4218319/Bluetooth-4-0--An-introduction-to-Bluetooth-Low-Energy-Part-II>.

"*About Bluetooth Low Energy Technology*;" Bluetooth®, Technical Information; retrieved on Jun. 20, 2012 from <http://www.bluetooth.com/Pages/low-energy-tech-info.aspx>.

\* cited by examiner

METHOD AND APPARATUS FOR UTILIZING ADVERTISEMENTS IN CONJUNCTION WITH DEVICE DISCOVERY

TECHNOLOGICAL FIELD

An example embodiment of the present invention relates generally to device discovery and, more particularly, to the use of advertisements in conjunction with device discovery.

BACKGROUND

Bluetooth is a proprietary open wireless technology for exchanging data over short distances and may be utilized to connect two or more devices for communication therebetween. In order to connect Bluetooth devices, a connection setup procedure must be performed with one device, referred to as a master device, being in a page mode in an effort to connect with another device, referred to as a slave device, that is, to be connected by performing a page scan. As shown in FIG. 1, the master device may transmit a page packet, also known as an identification (ID) packet, which includes the device access code (DAC) of the slave device. The slave device that is to be connected periodically performs a scan for page packets transmitted by other devices in proximity therewith. In an instance in which the slave device detects a page packet with its own DAC, the slave device may respond with an ID packet which consists of the DAC of the slave device. The master device then sends a frequency hop synchronization (FHS) packet to the slave device, when then responds with the ID packet. The master device may then transmit its first traffic, which may be a POLL-type of packet.

The Bluetooth device discovery scheme is not particularly power efficient for automatic background scanning. Additionally, the Bluetooth device discovery scheme may occupy all of the channel time that may be obtained for relatively lengthy periods of time. Thus, a Bluetooth device discovery scheme may disadvantageously consume a meaningful amount of power and disturb other connections, such as wireless local area networks (WLANs).

BRIEF SUMMARY

A method, apparatus and computer program product are provided according to an example embodiment for facilitating device discovery in an efficient manner. In this regard, the method, apparatus and computer program product of an example embodiment may provide for device discovery in a manner that may consume less power with reduced channel occupancy. Consequently, the method, apparatus and computer program product of an example embodiment may create less disturbance for other connections, such as WLANs, while still providing for device discovery.

In one embodiment, a method is provided that includes receiving an advertisement packet and determining, by an apparatus, a time period in which a source device of the advertisement packet will be performing a page scan based on information included in the received advertisement packet. The method of this embodiment also causes a page to be issued during the time period in which the source device of the advertisement packet will be performing the page scan. The advertisement packet, the page and the page scan packet may be transmitted in accordance with different techniques.

At least one of the advertisement packet or a response packet may indicate whether the page scan is interlaced. The advertisement packet of one embodiment may also indicate a scanning frequency of a page scan. In this embodiment, the page may be caused to be issued in accordance with the scanning frequency. The advertisement packet of one embodiment may also indicate at least one of a scan moment or a scan mode. In this embodiment, the page may be caused to be issued in accordance with at least one of the scan moment or the scan mode. The advertisement packet may indicate an advertisement interval and a number of advertisements prior to the page scan in order to define the time period during which the source device of the advertisement packet will be performing the page scan. In this embodiment, the determination of the time period in which the source device of the advertisement packet will be performing the page scan may be based upon the advertisement interval and the number of advertisements prior to the page scan.

In another embodiment, an apparatus is provided that includes at least one processor and at least one memory including computer program code with the at least one memory and the computer program code configured to, with the at least one processor, cause the apparatus at least to receive an advertisement packet and to determine a time period in which a source device of the advertisement packet will be performing a page scan based on information included in the received advertisement packet. The at least one memory and the computer program code of this embodiment are also configured to, with the at least one processor, cause the apparatus to cause a page to be issued during the time period in which the source device of the advertisement packet will be performing the page scan.

The advertisement packet or a response packet may indicate whether the page scan is interlaced. The advertisement packet may also include a scanning frequency of the page scan. In this embodiment, the at least one memory and the computer program code are configured to, with the at least one processor, cause the apparatus to cause the page to be issued by causing the page to be issued in accordance with the scanning frequency. The advertisement packet may also indicate at least one of a scan moment or a scan mode. In this embodiment, the at least one memory and the computer program code may be configured to, with the at least one processor, cause the apparatus to cause the page to be issued by causing the page to be issued in accordance with the at least one of the scan moment or the scan mode. The advertisement packet may indicate an advertisement interval and a number of advertisements prior to the page scan in order to define the time period during which the source device of the advertisement packet will be performing the page scan. In this embodiment, the at least one memory and the computer program code may be configured to, with the at least one processor, cause the apparatus to determine the time period by determining the time period in which the source device of the advertisement packet will be performing the page scan based upon the advertisement interval and the number of advertisements prior to the page scan.

In a further embodiment, a computer program product is provided that includes at least one non-transitory computer-readable storage medium having computer-executable program code stored therein with the computer-executable program code including program code for receiving an advertisement packet and program code for determining a time period in which a source device of the advertisement packet will be performing a page scan based on information included in the received advertisement packet. The computer-executable program code of this embodiment also include program code for causing a page to be issued during the time period in which the source device of the advertisement packet will be performing the page scan.

In yet another embodiment, an apparatus is provided that includes means for receiving an advertisement packet and means for determining a time period in which a source device of the advertisement packet will be performing a page scan based on information included in the received advertisement packet. The apparatus of this embodiment also includes means for causing a page to be issued during the time period in which the source device of the advertisement packet will be performing the page scan.

In one embodiment, a method is provided that includes generating, by an apparatus, an advertisement including information defining a time period in which a page scan will be performed by the apparatus. The method of this embodiment also causes transmission of the advertisement and causes a page scan to be performed during the time period.

At least one of the advertisement or a response packet may indicate whether the page scheme is interlaced. The advertisement may indicate the scanning frequency of the page scan such that the method may further include receiving a page is in accordance with the scanning frequency. The advertisement may indicate at least one of a scan moment or a scan mode such that the method may further include receiving a page may be in accordance with at least one of the scan moment or the scan mode. The advertisement may indicate an advertisement interval and a number of advertisements prior to the page scan in order to define the time period during which the apparatus will be performing the page scan. In this embodiment, causing transmission of the advertisement may including causing transmission of the number of advertisements in accordance with the advertisement interval prior to causing the page scan to be performed.

In another embodiment, an apparatus is provided that includes at least one processor and at least one memory including computer program code configured to, with the at least one processor, cause the apparatus at least to generate an advertisement including information defining a time period in which a page scan will be performed by the apparatus. The at least one memory and the computer program code of one embodiment are also configured to, with the at least one processor, cause the apparatus to cause transmission of the advertisement and to cause a page scan to be performed during the time period.

At least one of the advertisement or a response packet may indicate whether the page scan is interlaced. The advertisement may indicate the scanning frequency of the page scan with the at least one memory and the computer program code of this embodiment being configured to, with the at least one processor, cause the apparatus to receive a page in accordance with the scanning frequency. The advertisement may indicate at least one of a scan moment or a scan mode with the at least one memory and the computer program code of this embodiment being configured to, with the at least one processor, cause the apparatus to receive a page in accordance with at least one of the scan moment or the scan mode. The advertisement may indicate an advertisement interval and the number of advertisements prior to the page scan in order to define the time period during which the apparatus will be performing the page scan. The at least one memory and the computer program code of this embodiment may be configured to, with the at least one processor, cause the apparatus to cause transmission of the advertisement by causing transmission of the number of advertisements in accordance with the advertisement interval prior to causing the page scan to be performed.

In a further embodiment, a computer program product is provided that includes at least one non-transitory computer-readable storage medium having computer-executable program code stored therein with the computer-executable program code including program code for generating an advertisement including information defining a time period in which a page scan will be performed by an apparatus. The computer-executable program code of this embodiment also include program code for causing transmission of the advertisement and program code for causing a page scan to be performed during the time period.

In yet another embodiment, an apparatus is provided that includes means for generating an advertisement including information defining a time period in which a page scan will be performed by the apparatus. The apparatus of this embodiment also includes means for causing transmission of the advertisement and means for causing a page scan to be performed during the time period.

BRIEF DESCRIPTION OF THE DRAWINGS

Figure 1:
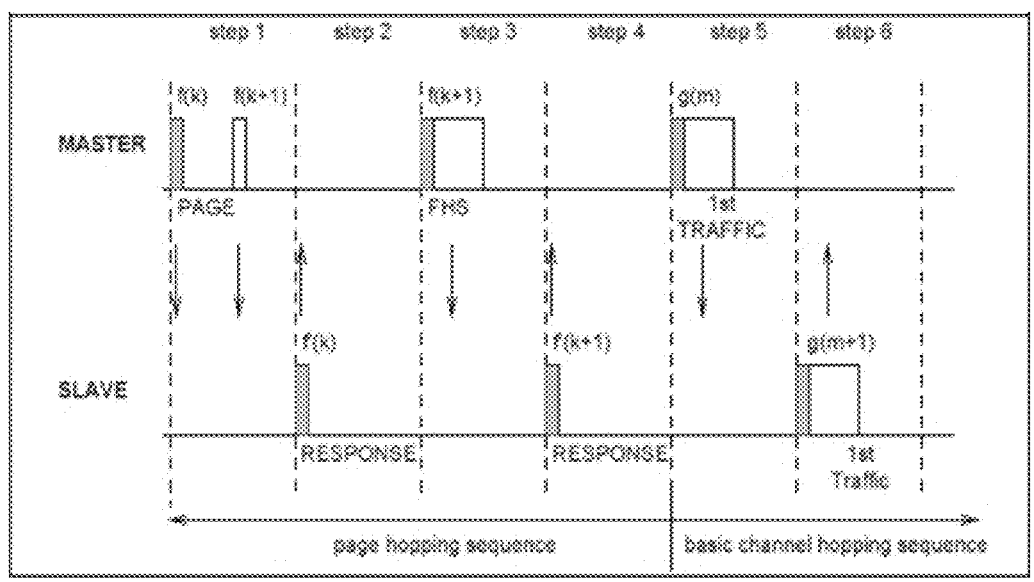
Figure 2:
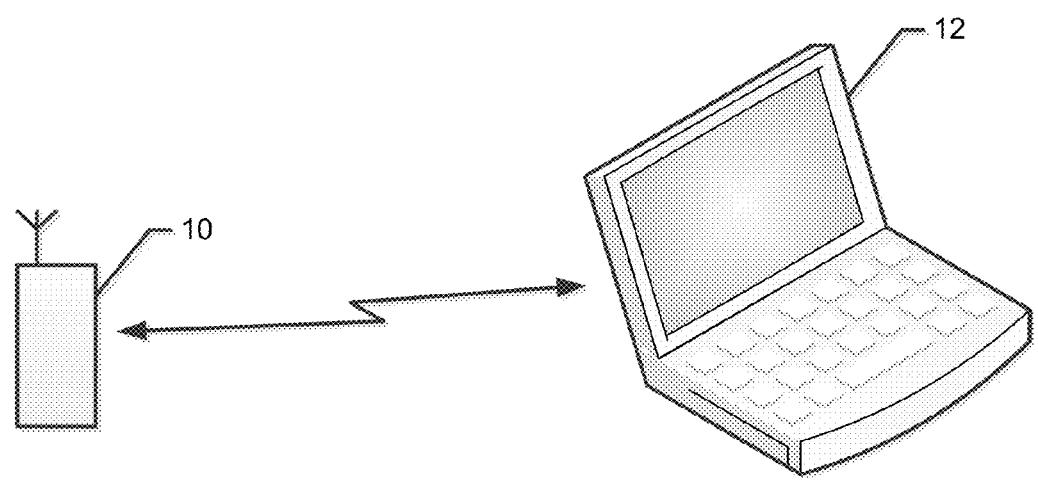
Figure 3:
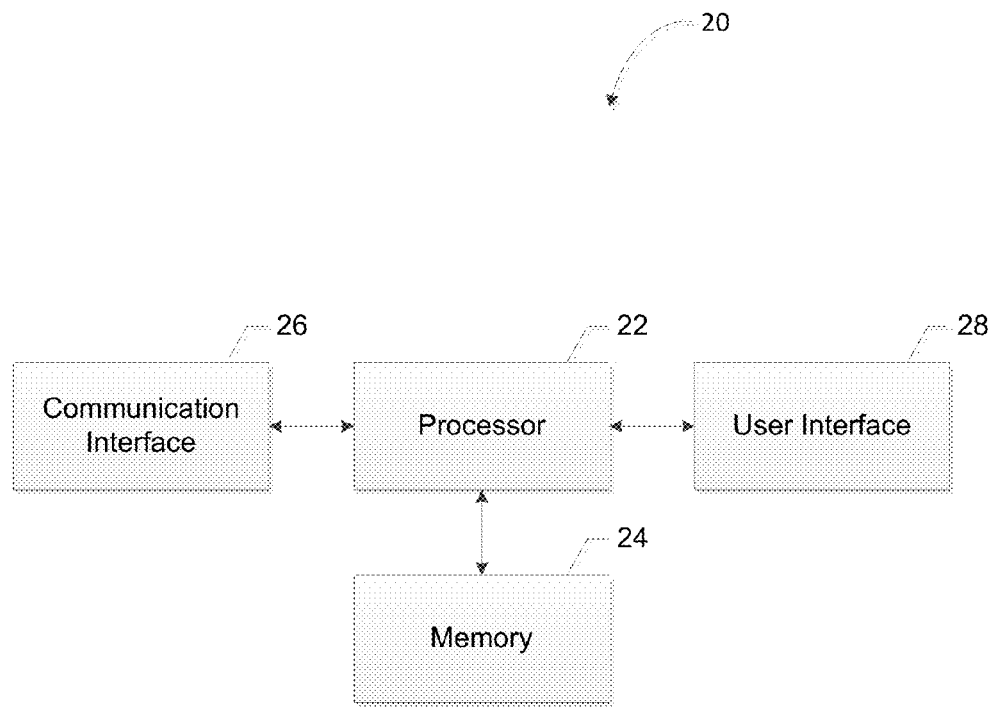
Figure 4:
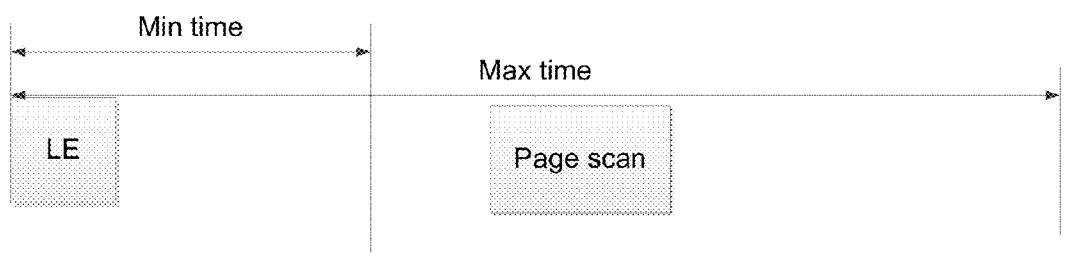
Figure 5:
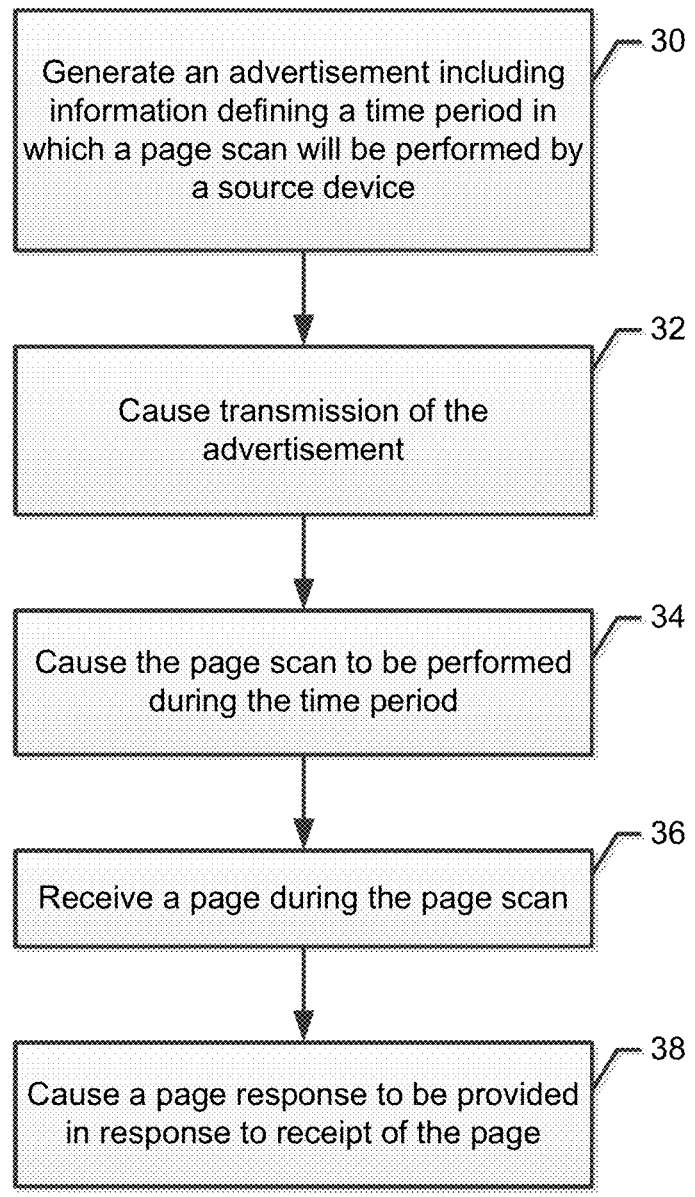
Figure 6:
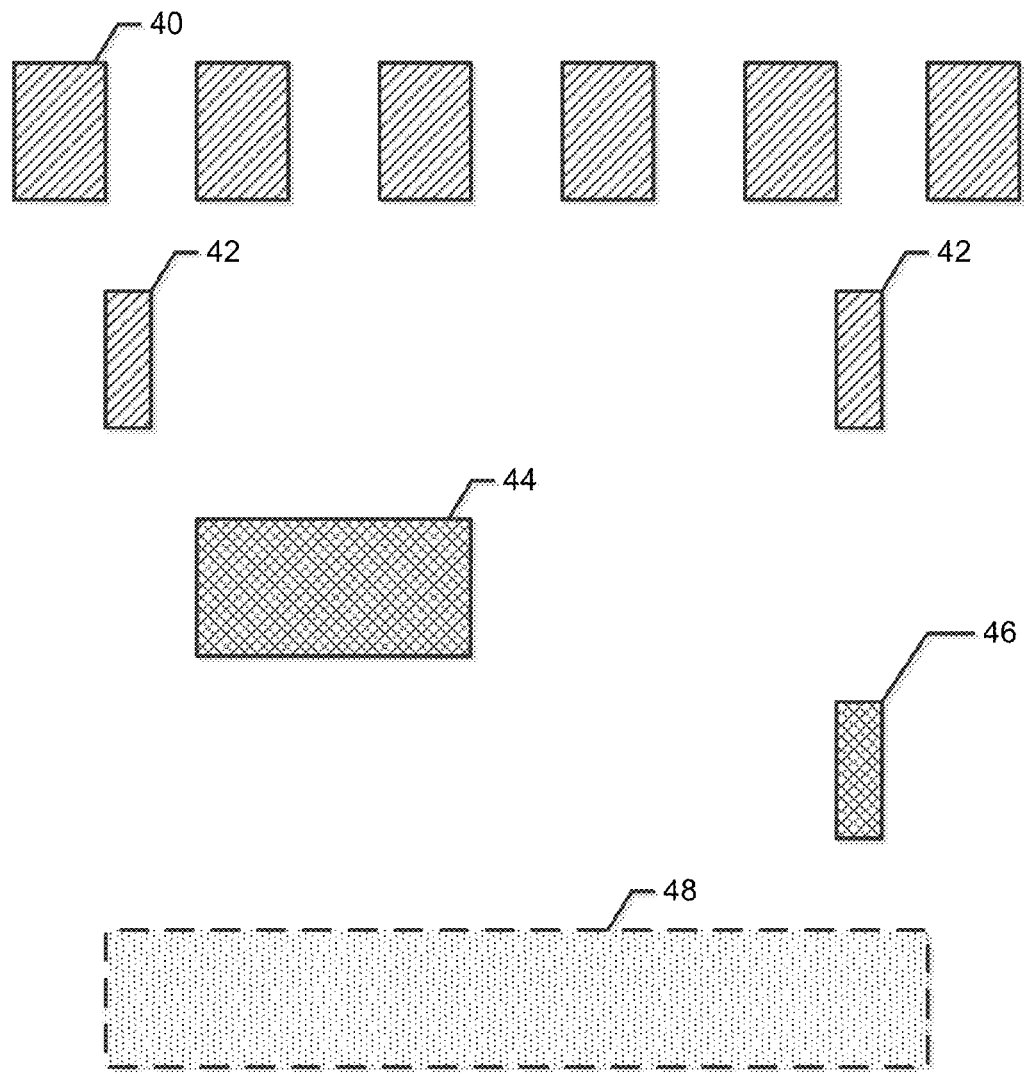
Figure 7:
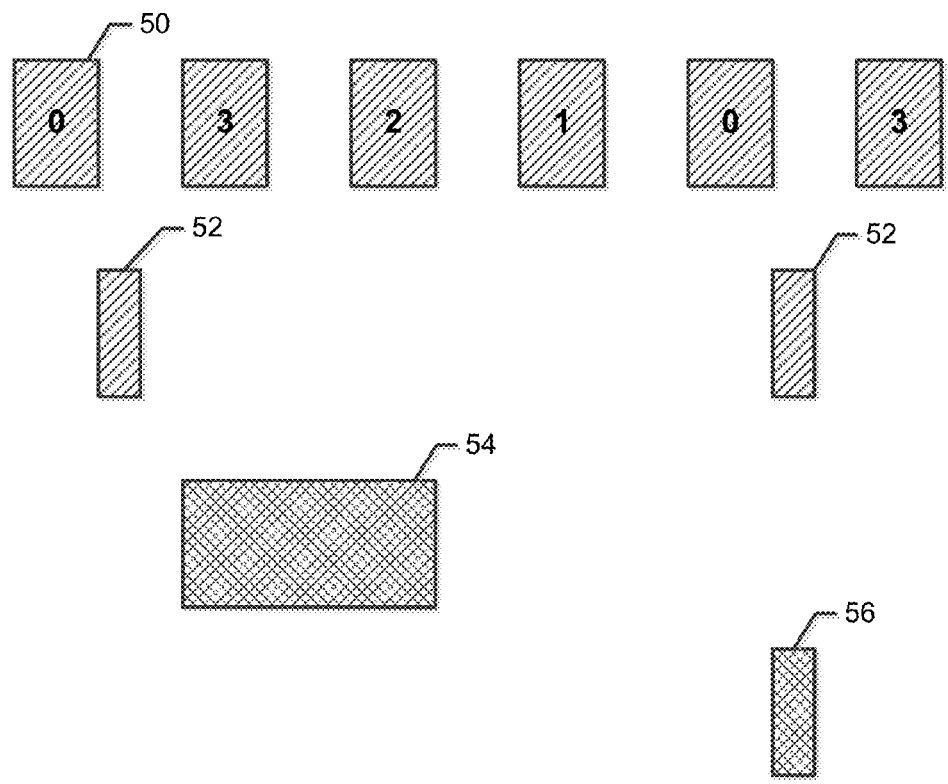
Figure 8:
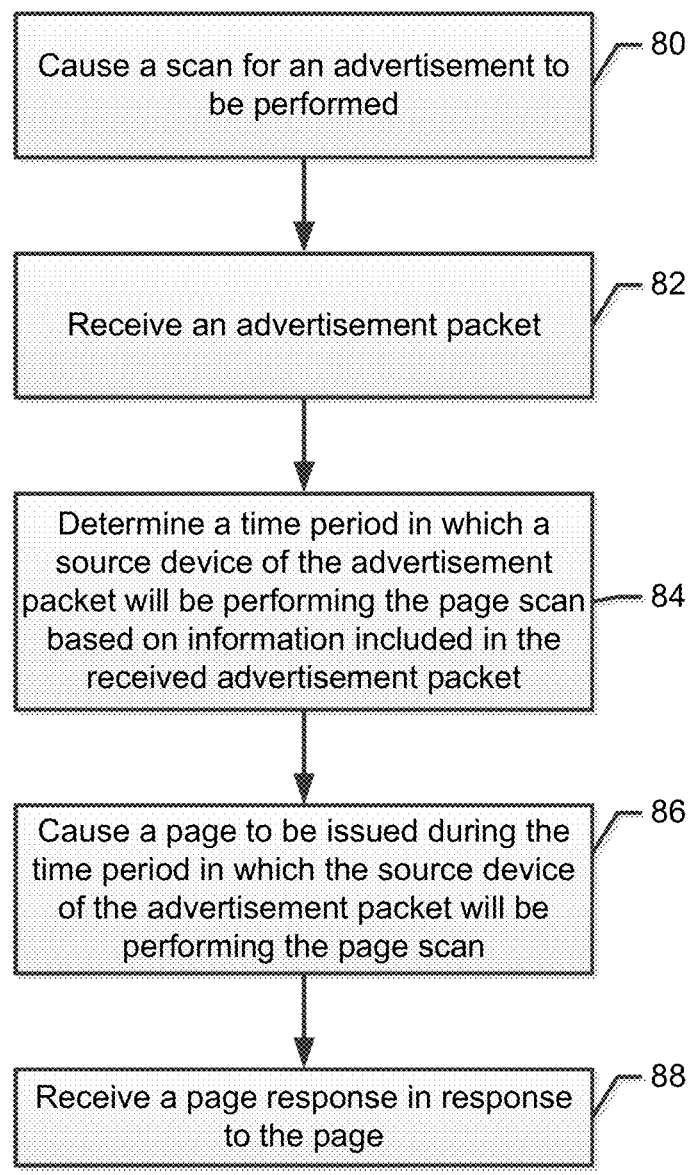
Figure 9:
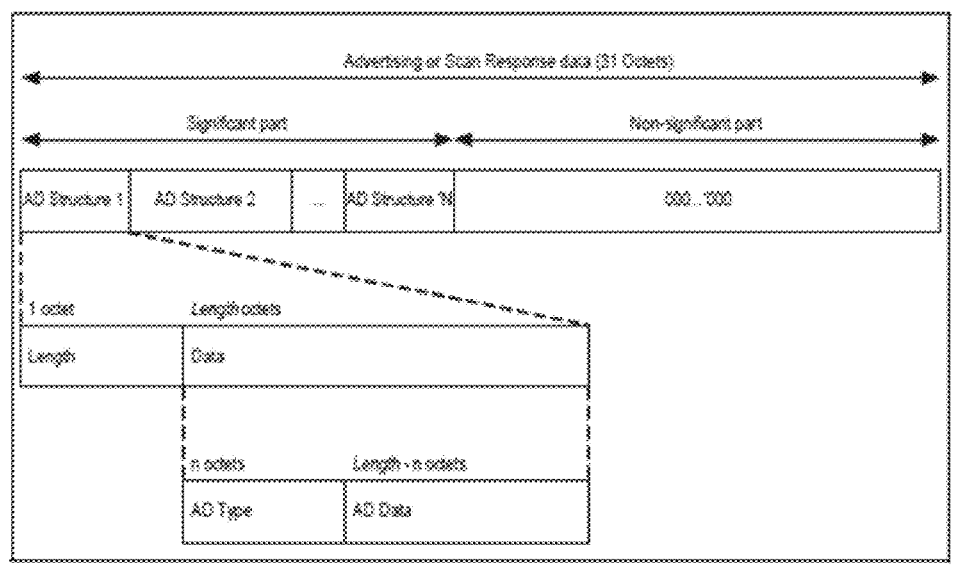
Figure 10:
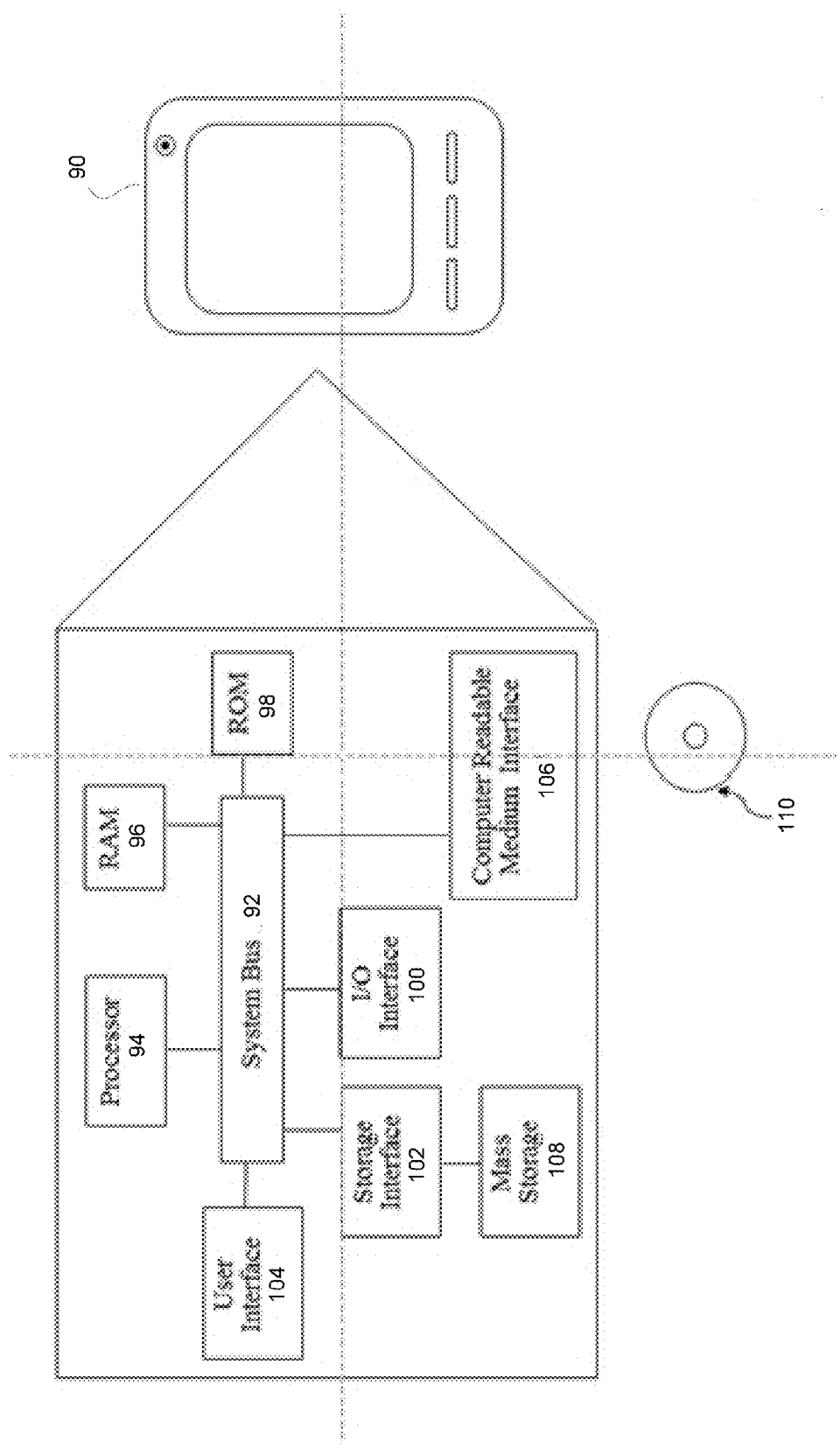

Having thus described example embodiments of the present disclosure in general terms, reference will now be made to the accompanying drawings, which are not necessarily drawn to scale, and wherein:

FIG. 1 is a timing diagram relating to Bluetooth connection establishment from Version 4.0 of the Bluetooth Core Specification;

FIG. 2 illustrates a pair of devices in proximity to one another that are capable of being discovered, such as in accordance with a Bluetooth device discovery scheme;

FIG. 3 is a block diagram of an apparatus that may be specifically configured in accordance with an example embodiment of the present invention and that may be embodied by either a master device seeking to discover other devices or a slave device to be discovered;

FIG. 4 is a timing diagram illustrating a page scan being performed between a minimum time and a maximum time as defined by an advertisement packet in accordance with an example embodiment of the present invention;

FIG. 5 is a flow chart illustrating the operations performed by an apparatus embodied by a slave device to be discovered in accordance with an embodiment of the present invention;

FIG. 6 is an illustration of a Bluetooth discovery procedure in accordance with an example embodiment of the present invention;

FIG. 7 is an illustration of a Bluetooth discovery procedure in accordance with another example embodiment of the present invention;

FIG. 8 is a flow chart illustrating the operations to be performed by an apparatus embodied by a master device that is attempting to discover other devices in accordance with an example embodiment of the present invention;

FIG. 9 is an example of a format that may be utilized in accordance with advertising data and scan response data in accordance with an example embodiment of the present invention; and FIG. 10 is a representation of a computer that may be specifically configured in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory, physical storage medium (e.g., volatile or non-volatile memory device), can be differentiated from a "computer-readable transmission medium," which refers to an electromagnetic signal.

A method, apparatus and computer program product of an example embodiment may provide for device discovery, such as to enable the discovery of devices in proximity to one another. In this regard, the method, apparatus and computer program product of an example embodiment will be described in conjunction with the discovery of Bluetooth devices. However, the method, apparatus and computer program product may be employed in conjunction with devices configured to communicate in accordance with other protocols including, but not limited, to device discovery associated with a WLAN, WiFi or the like. As such, reference to the Bluetooth protocol herein is provided by way of an example, but not of limitation.

Referring now to FIG. 2, a pair of devices are in proximity to one another such that a first device may discover a second device and, as such, establish communications therebetween. Various types of devices may discover one another and thereafter communicate with one another including, for example, various types of fixed terminals, such as a personal computer, a computer workstation or the like, and various types of mobile terminals, such as a portable computing device, e.g., a laptop computer or a tablet computer, a mobile telephone, a personal digital assistant (PDA), a universal serial bus (USB) or other dongle, a personal computer (PC) emulator card, a pager, a mobile television, a gaming device, an electronic book reader, a camera, an audio/video player, a radio, a global positioning system (GPS) device, or any combination of the aforementioned, and other types of communications devices. The devices engaged in device discovery may be of the same type, or may be different types of devices as shown in FIG. 2 in regards to a mobile telephone 10 and a laptop computer 12. Additionally, while two devices are shown in FIG. 2 to be engaged in device discovery, the method, apparatus and computer program product of one embodiment may be equally applicable to device discovery involving three or more devices in other embodiments.

In the following discussion, a first or master device will be described to be conducting the discovery procedure in an effort to discover one or more other devices, while a second or slave device will be a device to be discovered, such as by the first device. While some devices may be specifically configured to be a master device that endeavors to discover other devices and other devices may be specifically configured to be a slave device that is to be discovered, still other devices may be configured to alternatively function as either a master device or a slave device.

As noted above, a variety of devices may engage in a device discovery process in advance of establishing communications therebetween. The devices that engage in device discovery, including a master device that is conducting the device discovery process in order to discover other devices and a slave device that is to be discovered, may include, embody or otherwise be associated with an apparatus 20 that may be specifically configured in accordance with an example embodiment to the present invention as discussed hereinafter. An example embodiment of such an apparatus will now be described with reference to FIG. 3. It should be noted, however, that the devices or elements described below may not be mandatory and thus some may be omitted in certain embodiments. Referring now to FIG. 3, the apparatus of the illustrated embodiment may include or otherwise be in communication with a processor 22, a memory device 24, a communication interface 26 and a user interface 28. The memory device may comprise, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with example embodiments of the present invention. For example, the memory device could be configured to buffer input data for processing by the processor. Additionally or alternatively, the memory device could be configured to store instructions for execution by the processor.

The apparatus 20 may, in some embodiments, be a mobile or a fixed terminal as described above. However, in some embodiments, the apparatus may be embodied as a chip or chip set (which may in turn be employed at one of the devices mentioned above). In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may comprise, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to other devices. In this regard, the communication interface may comprise, for example, an antenna (or multiple antennas) and supporting hardware and/or software for enabling communications with a wireless communication network, e.g., WLAN. As such, for example, the communication interface may comprise a communication modem and/or other hardware/software for supporting communication via cable, digital subscriber line (DSL), USB or other mechanisms.

The user interface 28 may be in communication with the processor 22 to receive an indication of a user input at the user interface and/or to provide an audible, visual, mechanical or other output to the user. As such, the user interface may comprise, for example, a keyboard, a mouse, a joystick, a display, a touch screen(s), touch areas, soft keys, a microphone, a speaker, or other input/output mechanisms. For example, the user interface may comprise, among other devices or elements, any or all of a speaker, a microphone, a display, and a keyboard or the like. In this regard, for example, the processor may comprise user interface circuitry configured to control at least some functions of one or more elements of the user interface, such as, for example, a speaker, ringer, microphone, display, and/or the like. The processor and/or user interface circuitry comprising the processor may be configured to control one or more functions of one or more elements of the user interface through computer program instructions (e.g., software and/or firmware) stored on a memory accessible to the processor (e.g., memory device 24, and/or the like).

In order to provide for device discovery in a manner that reduces interference and power consumption, the method, apparatus and computer program product of an example embodiment may utilize an advertising channel to provide information regarding the device discovery process, such as timing information regarding a subsequent connection setup. In one embodiment that supports device discovery for Bluetooth devices, the method, apparatus and computer program product may utilize Bluetooth Low Energy (LE) as a power efficient transport mechanism by which to provide information regarding the device discovery process, such as timing information regarding a subsequent connection setup. In this regard, Bluetooth LE is defined by the Bluetooth Core Specification Version 4.0 and includes forty physical channels with three of the channels being advertising channels and the remaining thirty-seven channels being data channels. A physical channel may be sub-divided into time units known as events. Data may be transmitted between the devices in packets that are positioned in the events. There are two types of events: advertising events and connection events.

In one embodiment, the slave device, also known as a source device, may transmit an advertisement, such as a low energy advertisement, including one or more packets, e.g., low energy packets, via an advertising channel. The advertisement may include, among other types of information, a minimum time and a maximum time within which the slave device will scan for pages from a master device conducting a device discovery process. Thus, the maximum time and the minimum time defined by the advertisement establish a window in which the slave device will scan for pages as shown by FIG. 4. Consequently, the master device that is conducting the device discovery process in an effort to identify one or more slave devices may page the slave device during the time window defined by the maximum time and the minimum time, thereby increasing the likelihood that the slave device will be scanning for pages while the master device is issuing the page. Thus, the master device may limit the time duration of the page since the master device need only page the slave device during the time window defined by the maximum time and a minimum time and not at other times, thereby reducing power consumption and interference with other connections. Thereafter, a connection may be established between the devices to support communication therebetween.

By way of further explanation, reference is made to FIG. 5 in which the operations performed by an apparatus 20 embodied by a slave device are illustrated. In this embodiment, the apparatus embodied by the slave device may include means, such as the processor 22 or the like, for generating an advertisement, such as a low energy advertisement, including one or more packets, such as one or more low energy packets, with at least one packet defining a time period in which a page scan will be performed by the slave device. See block 30 of FIG. 5. As illustrated, for example, in FIG. 4, the time period during which a page scan will be performed by the slave device may be defined in terms of a maximum time and a minimum time. However, the packet may define the time period in other manners as will be described below.

The apparatus 20 embodied by the slave device may also include means, such as the processor 22, the communication interface 26 or the like, for causing transmission of the advertisement following its generation. See block 32 of FIG. 5. In this regard, the advertisement including one or more packets may be provided by being transmitted at one or more predefined frequencies to devices in proximity thereto.

The apparatus 20 embodied by the slave device may also include means, such as the processor 22, the communication interface 26 or the like, for causing a page scan to be performed during the time period that was defined by the advertisement. See block 34 of FIG. 5. In this regard, the page scan may scan for a page from a master device that is conducting a device discovery process. As such, the apparatus embodied by the slave device may include means, such the processor, the communication interface or the like, for receiving a page during the page scan, such as a page from a master device. See block 36. The apparatus embodied by the slave device may also include means, such as the processor, the communication interface or the like, for causing a page response to be provided in response to receipt of the page. See block 38.

Based upon the page response, the slave device may be discovered by the master device such that a connection, such as a basic rate (BR)/an enhanced data rate (EDR) connection, may be established between the master and slave devices to support communication therebetween. By having defined the time period in which the page scan will be performed, however, the page from the master device may be more specifically targeted, thereby improving the efficiency of the device discovery process by reducing the power consumption and channel occupancy associated with device discovery in accordance with an example embodiment to the present invention.

An example embodiment of a Bluetooth device discovery process in accordance with an example embodiment of the present invention is illustrated in FIG. 6. As shown, the slave device may generate a plurality of advertisements 40, such as low energy advertisements, including packets, e.g., low energy packets, that are caused to be provided in accordance with a predefined timing or spacing via an advertising channel. Among other things, the packets of the advertisements define the time period during which the slave device will perform a page scan with the slave device performing one or more page scans over time as shown at 42 in FIG. 6. After having performed a scan 44 for advertisements, the master device may issue a page 46 during the time period in which the slave device will be performing a page scan such that the slave device may receive the page during the page scan and cause a page response to be provided in response thereto. As such, the page issued by the master device may have a much smaller duration since the page may be tailored in accordance with the time period during which the slave device will perform the page scan and need not extend for as long a period of time as in a conventional device discovery process as shown at 48 in FIG. 6 for purposes of reference. Thus, the power consumption and interference with other types of connections may be reduced.

Another example of device discovery process in accordance with an example embodiment of the present invention is shown in FIG. 7. In this embodiment, a packet, e.g., a low energy packet, of an advertisement 50 indicates an advertisement interval and a number of advertisements that will be transmitted prior to the page scan in order to define the time period during which the slave device will perform the page scan. In this regard, the advertisements may be repeatedly provided at a predefined interval such that the number of advertisements that are indicated by the packet are provided and are spaced apart by the advertisement interval prior to causing the page scan to be performed. With reference to FIG. 7, the packet of the first advertisement designated 3 may indicate that three additional advertisements, namely, the advertisements designated 2, 1 and 0, will be provided prior the page scan with each of the advertisements being provided in accordance with a predefined advertisement interval. Thus, after the master device has scanned for the advertisement and received and interpreted the packet, such as the low energy packet associated with the low energy advertisement designated 3 in the example of FIG. 7, the master device of this embodiment may determine the time period in which the page scan will be performed by the slave device based on the number of advertisements and the predefined advertisement interval so as to align the page 56 with the time period during which the page scan 52 will be performed, as also shown in FIG. 7. Thus, the method, apparatus computer program product of example embodiments of the present invention may define the time period in which a page scan will be performed in various manners as exemplified by the embodiment of FIG. 7.

The advertisement packet or a response packet, such as a Bluetooth LE scan response packet, e.g., the SCAN_RSP packet, may also include other information or parameters associated with the device discovery process. For example, at least one of the advertisement packet or the response packet may indicate whether the page scan is interlaced. The advertisement packet may also indicate the scanning frequency of the page scan. Thus, the master device may cause the page to be issued in accordance with the scanning frequency such that the apparatus 20 embodied by the slave device and, more particularly, the processor 22, the communication interface 26 or the like, may receive the page in accordance with the scanning frequency. In this embodiment, the page need only be transmitted at the scanning frequency and, correspondingly, the page scan need only be conducted at the scanning frequency, thereby further reducing power consumption and reducing interference with other networks or devices. The advertisement packet of the one embodiment may also indicate at least one of a scan moment or scan mode. In this embodiment, the master device may cause the page to be issued in accordance with the scan moment or the scan mode and the apparatus 20 embodied by the slave device may, in turn, receive the page in accordance with at least one of the scan moment or the scan mode. While examples of the parameters associated with the device discovery process that may be provided by an advertisement packet and/or the response packet have been provided, an advertisement packet and/or the response packet may provide other parameters or information associated with the device discovery process in other embodiments.

Referring now to FIG. 8, the operations performed by an apparatus 20 embodied by a master device that is conducting a device discovery process in order to discover other devices are illustrated. As shown in block 80 of FIG. 8, the apparatus embodied by the master device may include means, such as the processor 22, the communication interface 26 or the like, for causing a scan for an advertisement, e.g., a low energy advertisement, to be performed. By way of example, FIGS. 6 and 7 illustrate scans for advertisements that may be performed by the master device of two different embodiments. The apparatus embodied by the master device may also include means, such as the processor, the communication interface or the like, for receiving an advertisement packet, e.g., a low energy packet, during the scan for the advertisement. See block 82. The advertisement packet defines a time period in which the source device of the advertisement, that is, the slave device, will be performing a page scan, as described above in conjunction with FIG. 5. The time period may be defined in various manners, including by the definition of minimum time and a maximum time as shown in FIG. 4. Alternatively, the advertisement packet may indicate an advertisement interval and the number of advertisements that remain to be transmitted prior to the page scan in order to define the time period during which the slave device will be performing the page scan as described above in conjunction with FIG. 7.

The apparatus 20 embodied by the master device also includes means, such as the processor 22 or the like, for determining the time period in which the slave device will be performing the page scan. See block 84 of FIG. 8. In an instance in which the time period defined by the advertisement packet identifies a minimum time and a maximum time, the processor of the master device may determine the time period to be that period between the maximum and minimum time and the minimum time. Alternatively, in an instance in which the advertisement packet indicates an advertisement interval and the number of advertisements prior to the page scan, the processor of the master device may determine the time period in which the slave device will be performing the page scan based upon the advertisement interval and the number of advertisements prior to the page scan as described above in conjunction with the embodiment of FIG. 7.

The apparatus 20 embodied by the master device also includes means, such as a processor 22, a communication interface 26 or the like, for causing a page to be issued during the time period in which the source device, that is, the slave device, will be performing the page scan. See block 86 of FIG. 8. As described above, in conjunction with the operations of FIG. 5 and the example embodiments of FIGS. 6 and 7, the page that is caused to be issued by the master device may be aligned with a page scan as a result of having been issued during the period in which the page scan will be performed, thereby permitting the duration of the page to be reduced and making the device discovery process more efficient in terms of power consumption and interference. The apparatus embodied by the maser device also includes means, such as the processor, the communication interface or the like, for receiving a page response in response to the page. See block 88.

As also described above in conjunction with FIG. 5, the advertisement packet and/or the response packet may provide other parameters or information associated with the device discovery process that may permit the apparatus 20 embodied by the master device to tailor the paging and other communications with the slave device. For example, the advertisement packet or the response packet may indicate whether the page scan is interlaced. Additionally or alternatively, the advertisement packet may indicate a scanning frequency of the page scans such that the page that is issued by the apparatus embodied by the master device may be in accordance with the scanning frequency, such as by being transmitted at the scanning frequency. By transmitting the page at the scanning frequency, the page need not be transmitted at other frequencies, thereby further improving the power consumption and interference relative to conventional techniques. Additionally or alternatively, the advertisement packet may indicate a scan moment and/or a scan mode such that the apparatus of the master device may be configured to issue or cause a page to be issued in accordance with the scan moment and/or the scan mode.

The advertisement including one or more packets and the page response may be provided by the apparatus 20 embodied by the slave device in accordance with a variety of different formats. One example of a format that may be utilized for the advertisement and/or a page response provided by an apparatus embodied by the slave device is shown in FIG. 9. In this embodiment, the data includes a significant part and a non-significant part. The significant part contains a sequence of advertisement (AD) structures. Each AD structure of this embodiment has a length field of one octet, which contains the length value, and a data field having a number of octets equal to the value of the length field. The first octet of the data field of this embodiment includes the AD type field. The content of the remaining octets in the data field depends on the value of the AD type field and may be referred to as AD data. The non-significant part extends the data to 31 octets and shall contain all zero octets. As such, only the significant part of the data needs to be transmitted. For example, in an instance in which the AD structures comprise an advertisement, the data may be transmitted in advertising events with the advertising data being placed in the ADV data field of ADV_IND, ADV_NONCONN_IND and/or ADV_SCAN_IND packets as defined by the Bluetooth Core Specification Version 4.0. Alternatively, in an instance in which the AD structures comprise a scan response, the scan response data may be sent to the ScanRspData field of the SCAN_RSP packets as also defined by the Bluetooth Core Specification Version 4.0.

In one example embodiment, the AD type may equal Bluetooth (BT) page scan information and one octet of the AD data may include flags regarding, for example, whether the page scan is interlaced or not and the type of timing, such as by being timed in milliseconds as per the example of FIG. 6 or by the number of advertisements as per the example of FIG. 7. Another octet of the AD data of this embodiment may include the next page scan frequency. In an instance in which the page scan timing is to be provided in milliseconds, two octets of the AD data may include the minimum time to the next page scan in milliseconds and two octets of the AD data may include the maximum time to the next page scan in milliseconds, thereby defining the time period, such as shown in FIG. 4. Alternatively, in an instance in which the page scan timing is to be provided by the number of advertisements, two octets of the AD data may define the advertisement interval in milliseconds, such as in terms of an integer multiple of 0.625 milliseconds, and two octets of the AD data may define the time to the next page scan in terms of the number of advertisements to be transmitted prior to the next page scan. In either instance, the AD data provided by the packet may define the time period during which the page scan will be performed, thereby allowing the page issued by the master device to be aligned with the page scan in order to increase the efficiency of the device discovery process of an example embodiment of the present invention.

As described above, FIGS. 5 and 8 are flowcharts of a method, apparatus and program product from the perspective of a slave device and a master device, respectively, according to example embodiments of the invention. It will be understood that each block of the flowchart, and combinations of blocks in the flowcharts, may be implemented by various means, such as hardware, firmware, processor, circuitry and/or other device associated with execution of software including one or more computer program instructions. For example, one or more of the procedures described above may be embodied by computer program code. In this regard, the computer program code which embodies the procedures described above may be stored by a memory device 24 of an apparatus 20 employing an embodiment of the present invention and executed by a processor 22 in the apparatus. As will be appreciated, any such computer program code may be loaded onto a computer or other programmable apparatus (e.g., hardware) to produce a machine, such that the resulting computer or other programmable apparatus embody a mechanism for implementing the functions specified in the flowchart blocks. These computer program code may also be stored in a non-transitory computer-readable storage memory (as opposed to a transmission medium such as a carrier wave or electromagnetic signal) that may direct a computer or other programmable apparatus to function in a particular manner, such that the code stored in the computer-readable memory produce an article of manufacture the execution of which implements the function specified in the flowchart blocks. The computer program code may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 5 and 8, when executed, convert a computer or processing circuitry into a particular machine configured to perform an example embodiment of the present invention. Accordingly, the operations of FIGS. 5 and 8 define an algorithm for configuring a computer or processing circuitry (e.g., processor) to perform an example embodiment. In some cases, a general purpose computer may be configured to perform the functions shown in FIGS. 5 and 8 (e.g., via configuration of the processor), thereby transforming the general purpose computer into a particular machine configured to perform an example embodiment.

Accordingly, blocks of the flowcharts support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order, including concurrently, and in any combination.

As described, various operations and/or the like described herein may be executed by and/or with the help of computers. Further, for example, devices described herein may be and/or may incorporate computers. The phrases "computer", "general purpose computer", "computing device" and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on memory 24 of apparatus 20 of FIG. 3. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 10. A computer-readable medium may comprise a computer-readable storage medium that may be any media or means that may contain or store the instructions for use by or in connection with an instruction execution system, apparatus, or device, such as a computer.

The phrases "general purpose computer", "computer", "computing device" and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 90 as shown in FIG. 10 that may be considered as one embodiment of the apparatus 20 of FIG. 3 may include various hardware modules for causing the computer to implement one or more embodiments of the present invention. According to one example, the computer 90 include a system bus 92 which may operatively connect processor 94, random access memory (RAM) 96 and read-only memory (ROM) 98 that may store, for example, a computer code for the computer 90 to perform one or more of the example methods illustrated on FIGS. 5 and 8. The system bus 92 may further operatively connect input output (I/O) interface 100, storage interface 102, user interface 104 and computer readable medium interface 106. Storage interface 102 may comprise or be connected to mass storage 108.

Mass storage 108 may be a hard drive, optical drive, or the like. Processor 94 may comprise a microcontroller unit (MCU), a digital signal processor (DSP), or any other kind of processor. Computer 90 as shown in this example also comprises a touch screen and keys operating in connection with the user interface 104. In various example embodiments, a mouse, and/or a keypad may alternately or additionally be employed. Computer 90 may additionally include the computer readable medium interface 106, which may be embodied by a card reader, a DVD drive, a floppy disk drive, and/or the like. Thus, media containing program code, for example for performing methods of FIGS. 5 and 8, may be inserted for the purpose of loading the code onto the computer.

Computer 90 may run one or more software modules designed to perform one or more of the above-described operations. Corresponding program code may be stored on a physical media 110 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving, by an apparatus, an advertisement packet via a Bluetooth low energy (LE) protocol;
   determining, by the apparatus, a time period in which a source device of the advertisement packet will be performing a page scan using Bluetooth basic rate (BR)/enhanced data rate (EDR) protocol based on information included in the received advertisement packet;
   causing, by the apparatus, a Bluetooth basic rate (BR)/enhanced data rate (EDR) protocol page to be issued during the time period in which the source device of the advertisement packet will be performing the page scan; and
   continuing establishment of a Bluetooth basic rate (BR)/enhanced data rate (EDR) connection to support communication with the source device following receipt of a page response from the source device.

2. A method according to claim 1 wherein at least one of the advertisement packet or a response packet indicates whether the page scan is interlaced.

3. A method according to claim 1 wherein the advertisement packet further indicates a scanning frequency of the page scan, and wherein causing the page to be issued comprises causing the page to be issued in accordance with the scanning frequency.

4. A method according to claim 1 wherein the advertisement packet further indicates at least one of a scan moment or a scan mode, and wherein causing the page to be issued comprises causing the page to be issued in accordance with the at least one of the scan moment or the scan mode.

5. A method according to claim 1 wherein the advertisement packet indicates an advertisement interval and a number of advertisements prior to the page scan in order to define the time period during which the source device of the advertisement packet will be performing the page scan, and wherein determining the time period comprises determining the time period in which the source device of the advertisement packet will be performing the page scan based upon the advertisement interval and the number of advertisements prior to the page scan.

6. An apparatus comprising:
   at least one processor; and
   at least one memory including computer program code, the at least one memory and the computer program code configured to, with the at least one processor, cause the apparatus to perform at least the following:
   receive an advertisement packet via a Bluetooth low energy (LE) protocol;
   determine a time period in which a source device of the advertisement packet will be performing a page scan using a Bluetooth basic rate (BR)/enhanced data rate (EDR) protocol based on information included in the received advertisement packet;
   cause a Bluetooth basic rate (BR)/enhanced data rate (EDR) protocol page to be issued during the time period in which the source device of the advertisement packet will be performing the page scan; and
   continuing establishment of a Bluetooth basic rate (BR)/enhanced data rate (EDR) connection to support communication with the source device following receipt of a page response from the source device.

7. An apparatus according to claim 6 wherein at least one of the advertisement packet or a response packet indicates whether the page scan is interlaced.

8. An apparatus according to claim 6 wherein the advertisement packet further indicates a scanning frequency of the page scan, and wherein the at least one memory and the computer program code are configured to, with the at least one processor, cause the apparatus to cause the page to be issued by causing the page to be issued in accordance with the scanning frequency.

9. An apparatus according to claim 6 wherein the advertisement packet further indicates at least one of a scan moment or a scan mode, and wherein the at least one memory and the computer program code are configured to, with the at least one processor, cause the apparatus to cause the page to be issued by causing the page to be issued in accordance with the at least one of the scan moment or the scan mode.

10. An apparatus according to claim 6 wherein the advertisement packet indicates an advertisement interval and a number of advertisements prior to the page scan in order to define the time period during which the source device of the advertisement packet will be performing the page scan, and wherein the at least one memory and the computer program code are configured to, with the at least one processor, cause the apparatus to determine the time period by determining the time period in which the source device of the advertisement packet will be performing the page scan based upon the advertisement interval and the number of advertisements prior to the page scan.

11. A computer program product comprising computer executable program code recorded on a non-transitory computer readable storage medium, the computer executable program code comprising:
    code for receiving an advertisement packet via a Bluetooth low energy (LE) protocol;
    code for determining a time period in which a source device of the advertisement packet will be performing a page scan using a Bluetooth basic rate (BR)/enhanced data rate (EDR) protocol based on information included in the received advertisement packet;
    code for causing a Bluetooth basic rate (BR)/enhanced data rate (EDR) protocol page to be issued during the time period in which the source device of the advertisement packet will be performing the page scan; and
    continuing establishment of a Bluetooth basic rate (BR)/enhanced data rate (EDR) connection to support communication with the source device following receipt of a page response from the source device.

12. A method comprising:
generating, by an apparatus, an advertisement including information defining a time period in which a Bluetooth basic rate (BR)/enhanced data rate (EDR) page scan will be performed by the apparatus;
causing, by the apparatus, transmission of the advertisement via a Bluetooth low energy (LE) protocol;
causing, by the apparatus, the Bluetooth basic rate (BR)/enhanced data rate (EDR) page scan to be performed during the time period; and
causing, by the apparatus, issuance of a Bluetooth basic rate (BR)/enhanced data rate (EDR) page response for establishing a Bluetooth basic rate (BR)/enhanced data rate (EDR) connection with another device in response to receiving a Bluetooth basic rate (BR)/enhanced data rate (EDR) page from the another device.

13. A method according to claim 12 wherein at least one of the advertisement or a response packet indicates whether the page scan is interlaced.

14. A method according to claim 12 wherein the advertisement indicates a scanning frequency of the page scan, and wherein the method further comprises receiving a page in accordance with the scanning frequency.

15. A method according to claim 12 wherein the advertisement indicates at least one of a scan moment or a scan mode, and wherein the method further comprises receiving a page in accordance with at least one of the scan moment or the scan mode.

16. A method according to claim 12 wherein the packet indicates an advertisement interval and a number of advertisements prior to the page scan in order to define the time period during which the apparatus will be performing the page scan, and wherein causing transmission of the advertisement comprises causing transmission of the number of advertisements in accordance with the advertisement interval prior to causing the page scan to be performed.

17. An apparatus comprising:
at least one processor; and
at least one memory including computer program code, the at least one memory and the computer program code configured to, with the at least one processor, cause the apparatus to perform at least the following:
generate an advertisement including information defining a time period in which a Bluetooth basic rate (BR)/enhanced data rate (EDR) page scan will be performed by the apparatus;
cause transmission of the advertisement via a Bluetooth low energy (LE) protocol;
cause the Bluetooth basic rate (BR)/enhanced data rate (EDR) page scan to be performed during the time period; and
cause issuance of a Bluetooth basic rate (BR)/enhanced data rate (EDR) page response for establishing a Bluetooth basic rate (BR)/enhanced data rate (EDR) connection with another device in response to receiving a Bluetooth basic rate (BR)/enhanced data rate (EDR) page from the another device.

18. An apparatus according to claim 17 wherein at least one of the advertisement or a response packet indicates whether the page scan is interlaced.

19. An apparatus according to claim 17 wherein the advertisement indicates a scanning frequency of the page scan, and wherein the at least one memory and the computer program code are further configured to, with the at least one processor, cause the apparatus to receive a page in accordance with the scanning frequency.

20. An apparatus according to claim 17 wherein the advertisement indicates at least one of a scan moment or a scan mode, and wherein the at least one memory and the computer program code are further configured to, with the at least one processor, cause the apparatus to receive a page in accordance with at least one of the scan moment or the scan mode.

21. An apparatus according to claim 17 wherein the advertisement indicates an advertisement interval and a number of advertisements prior to the page scan in order to define the time period during which the apparatus will be performing the page scan, and wherein the at least one memory and the computer program code are configured to, with the at least one processor, cause the apparatus to cause transmission of the advertisement by causing transmission of the number of advertisements in accordance with the advertisement interval prior to causing the page scan to be performed.

22. A computer program product comprising computer executable program code recorded on a non-transitory computer readable storage medium, the computer executable program code comprising:
code for generating an advertisement including information defining a time period in which a Bluetooth basic rate (BR)/enhanced data rate (EDR) page scan will be performed by the apparatus;
code for causing transmission of the advertisement via a Bluetooth low energy (LE) protocol;
code for causing the Bluetooth basic rate (BR)/enhanced data rate (EDR) page scan to be performed during the time period; and
code for causing issuance of a Bluetooth basic rate (BR)/enhanced data rate (EDR) page response for establishing a Bluetooth basic rate (BR)/enhanced data rate (EDR) connection with another device in response to receiving a Bluetooth basic rate (BR)/enhanced data rate (EDR) page from the another device.

23. A method according to claim 1 wherein the advertisement packet includes information defining the time period during which the source device of the advertisement packet will be performing the page scan using the Bluetooth basic rate (BR)/enhanced data rate (EDR) protocol.

24. An apparatus according to claim 6 wherein the advertisement packet includes information defining the time period during which the source device of the advertisement packet will be performing the page scan using the Bluetooth basic rate (BR)/enhanced data rate (EDR) protocol.

25. A computer program product according to claim 11 wherein the advertisement packet includes information defining the time period during which the source device of the advertisement packet will be performing the page scan using the Bluetooth basic rate (BR)/enhanced data rate (EDR) protocol.

* * * * *